United States Patent [19]
Kiuchi et al.

[11] Patent Number: 4,464,032
[45] Date of Patent: Aug. 7, 1984

[54] EXPOSURE TIME CONTROL DEVICE

[75] Inventors: Masayoshi Kiuchi; Masanori Uchidoi; Kazunobu Urushihara, all of Tokyo, Japan

[73] Assignee: Canon Kabushiki Kaisha, Tokyo, Japan

[21] Appl. No.: 410,692

[22] Filed: Aug. 23, 1982

[30] Foreign Application Priority Data

Aug. 26, 1981 [JP] Japan ................................ 56-134446
Dec. 29, 1981 [JP] Japan ................................ 56-215340

[51] Int. Cl.³ .......................... G03B 9/62; G03B 9/64
[52] U.S. Cl. ................................................ 354/234.1
[58] Field of Search .......................... 354/50, 51, 234; 354/459, 234.1

[56] References Cited

U.S. PATENT DOCUMENTS 3,721,166  3/1973  Yanagi et al. ...................... 354/51
3,953,867  4/1976  Kondo ............................. 354/234 X
4,315,678  2/1982  Tsunefuji ........................... 354/51

Primary Examiner—Michael L. Gellner
Attorney, Agent, or Firm—Toren, McGeady and Stanger

[57] ABSTRACT

An exposure time control device includes electromagnets for causing corresponding leading and trailing shutter curtains in a camera to travel. A second timer circuit, which is adjustable, is arranged to count a correction time in response to operation of a first timer circuit which counts an exposure time for the camera. After the lapse of the correction count time of the second timer circuit, the electromagnet for the leading shutter curtain is actuated, and then the electromagnet for the trailing shutter curtain is actuated after the lapse of the exposure count time of the first timer circuit. Exposure time errors which would otherwise result from overlapping of the shutter curtains and response delay of the trailing shutter curtain electromagnet, thus can be corrected by adjustment of the second timer circuit.

7 Claims, 10 Drawing Figures

| SHETTER TIME | $D_1$ $D_2$ $D_3$ | $D_4$ $D_5$ $D_6$ $D_7$ | DECODER OUT PUT | NAND GATE |
|---|---|---|---|---|
| 4 | 0 0 0 | 1 1 0 0 | C | $N_{13}$ |
| 2 | 0 0 0 | 1 0 1 1 | B | $N_{12}$ |
| 1 | 0 0 0 | 1 0 1 0 | A | $N_{11}$ |
| $\frac{1}{2}$ | 0 0 0 | 1 0 0 1 | 9 | $N_{10}$ |
| $\frac{1}{4}$ | 0 0 0 | 1 0 0 0 | 8 | $N_9$ |
| $\frac{1}{8}$ | 0 0 0 | 0 1 1 1 | 7 | $N_8$ |
| $\frac{1}{15}$ | 0 0 0 | 0 1 1 0 | 6 | $N_7$ |
| $\frac{1}{30}$ | 0 0 0 | 0 1 0 1 | 5 | $N_6$ |
| $\frac{1}{60}$ | 0 0 0 | 0 1 0 0 | 4 | $N_5$ |
| $\frac{1}{125}$ | 0 0 0 | 0 0 1 1 | 3 | $N_4$ |
| $\frac{1}{250}$ | 0 0 0 | 0 0 1 0 | 2 | $N_3$ |
| $\frac{1}{500}$ | 0 0 0 | 0 0 0 1 | 1 | $N_2$ |
| $\frac{1}{1000}$ | 0 0 0 | 0 0 0 0 | 0 | $N_1$ |

FIG.9

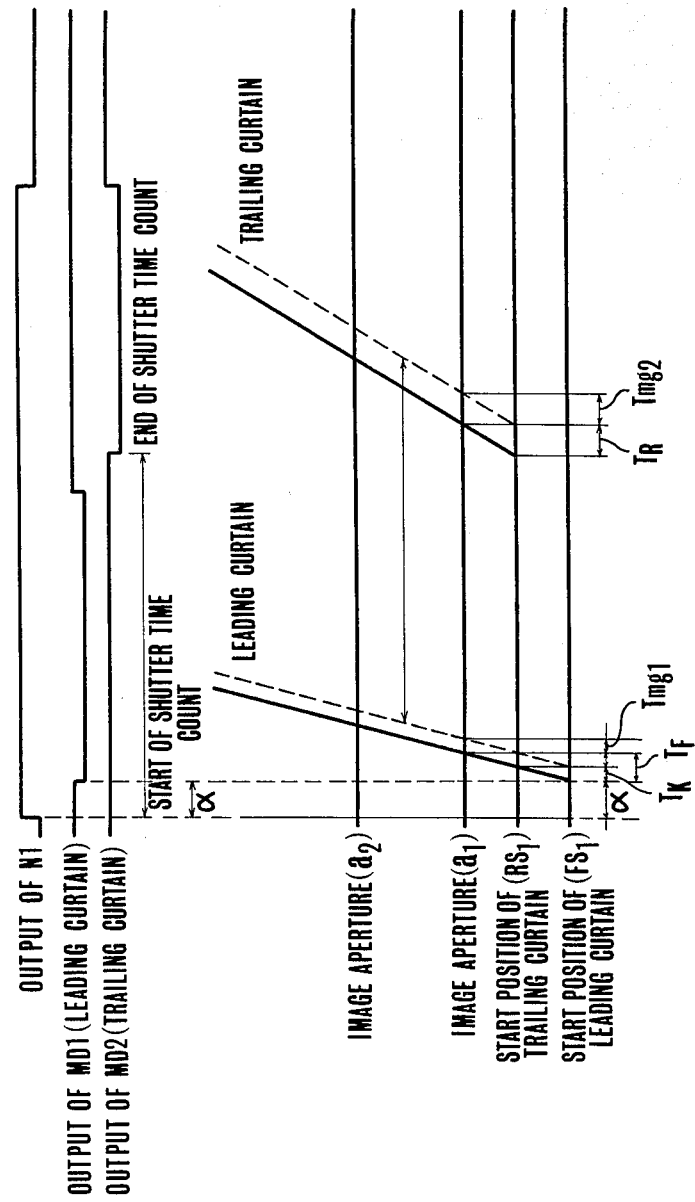

EXPOSURE TIME CONTROL DEVICE

BACKGROUND OF THE INVENTION

1. Field of the Invention

This invention relates to an exposure time control device which is arranged to correct an exposure error resulting from overlapping of the curtains of a focal plane shutter, and the like.

2. Description of the Prior Art

Generally, exposure time control for a camera having a focal plane shutter is performed as follows: An exposure time controlling timer circuit is actuated to perform a time counting operation while a leading shutter curtain is allowed to travel by a shutter release of the camera; upon termination of an exposure time counted by the timer circuit, say, 1/1000 sec., 1/500 sec., etc., a trailing shutter curtain is allowed to travel. However, in a focal plane shutter, the leading and trailing curtains of the shutter must be partially overlapped at the time of shutter charging and before commencement of a shutter operation. Besides, there is some response delay of the magnet arranged to hold the trailing curtain. Accordingly, the starting positions of the leading and trailing shutter curtains differ from each other, while the response delay of the magnet makes it impossible to have the actual length of film exposure time coincide with the counted length of exposure time. Therefore, it has been impossible to accomplish precise exposure control through the mere arrangement of starting a time counting operation concurrently with the travel of the leading shutter curtain, and allowing the trailing shutter curtain to travel upon completion of the time counting operation.

To solve this problem, in the conventional cameras using focal plane shutters, an adjusting time Tx is arranged in addition to the exposure time. More specifically, the delay time Tmg of the magnet, the overlapping time Tg of the shutter curtains, the exposure count time Te and the actual length of film exposing time TA are in the following relation: $TA+Tg=Te+Tmg$. The film exposing time TA, therefore, can be expressed as follows: $TA=Te+Tmg-Tg$. It is impossible to obtain a relation of TA=Te. The exposure count time and the film exposing time thus never coincide with each other. Accordingly, it is necessary to obtain the relation of TA=Te by adjusting the travelling time of the shutter curtains and the counting time. However, to accomplish this adjustment in a mechanical manner is difficult because the overlapping degree of shutter curtains and the response delay of the magnet of one camera differ from those of another. To overcome this difficulty, in the conventionally practiced method, an adjusting time Tx is added to the count time Te through a timer circuit; and the relation of TA=Te is obtained by actuating the trailing curtain holding magnet after the lapse of a length of time Te+Tx (hereinafter this method will be called the plus exposure time adjusting method).

In other words, the conventional devices are arranged to have a relation of $Te+Tx+Tmg=Tg+TA$ and the Tx is adjusted to become Tg−Tmg through the timer circuit. A relation of Te=TA is realized by equalizing the count time Te with the film exposing time TA through the above stated adjustment.

The adverse effect which is caused to take place to uneven degrees in cameras, by the overlapping time Tg of the shutter curtains and the response delay time Tmg of the magnet, thus has been simply coped with by equalizing the count time and the film exposing time to each other through the adjustment time $Tx=Tg-Tmg$ provided by the timer conduit.

However, even with the above stated method, the relation of Te=TA becomes hardly realizable, and there arises an exposure error in cases where the shutter curtain overlapping time Tg is shorter than the response delay time Tmg of the magnet. In other words, since the adjustment time Tx is Tg−Tmg, in the case of Tg<Tmg, the adjustment time Tx becomes Tx<0 which makes the adjustment hardly possible. To solve this problem, an exposure control circuit has recently been proposed as disclosed in a U.S. patent application, Ser. No. 144,981, filed Apr. 30, 1980. In accordance with the method of this exposure control circuit (hereinafter called the minus exposure time adjusting method), the count time Te for the exposure is arranged to be shorter than the film exposing time TA for exposing the film surface to a proper degree, such as 1/1000, 1/500, etc., by a predetermined length of time Tc, such as 0.5 msec. In short, the above stated problem is solved by obtaining a relation of $TA-Tc=Te$.

More specifically stated, in the formula given above, $Te+Tmg+Tx=Tg+TA$, Te is arranged to be TA−Tc to obtain a relation of TA−Tc+Tmg+Tc. With this arrangement employed, even when an increase in the shutter curtain travelling speed results in a relation of Tg<Tmg, time adjustment can be accomplished through the adjustment time Tx so long as the relation does not become Tg+Tc<Tmg. Therefore, in accordance with the minus exposure time adjusting method, the exposure error due to the adjustment time Tx can be corrected. Even when an increase in the travelling speed of the shutter curtains causes the delay time of the magnet to become longer than the overlapping time of the shutter curtains, the exposure error due to the overlapping of the shutter curtains and the response delay of the magnet can be corrected by the adjustment time Tx.

However, since the exposure count time Te is arranged to be shorter than the exposure time TA by a certain predetermined length of time Te in accordance with the proposed method, there is a certain limit to the predetermined time Tc. For example, the limit to the time Tc is 1 msec where the highest shutter speed or time is 1/1000 sec and is 0.5 msec where the highest shutter speed is 1/2000. The time Tc is thus limited by the highest shutter operating speed. Accordingly, adjustment becomes impossible and an exposure error inevitably arises if this limit is exceeded.

SUMMARY OF THE INVENTION

It is a general object of the invention to provide an exposure time control device which obviates the shortcomings of the prior art mentioned above.

The above and further objects and features of the invention will become apparent from the following detailed description of preferred embodiments thereof taken in connection with the accompanying drawings.

BRIEF DESCRIPTION OF THE DRAWINGS

FIG. 9 is a table showing the contents of a register RE, the output of a decoder and the relation of NAND gates N1–N13 to shutter time values.

FIG. 10 is an illustration of the operations of leading and trailing shutter curtains.

DETAILED DESCRIPTION OF PREFERRED EMBODIMENTS

Figure 1:
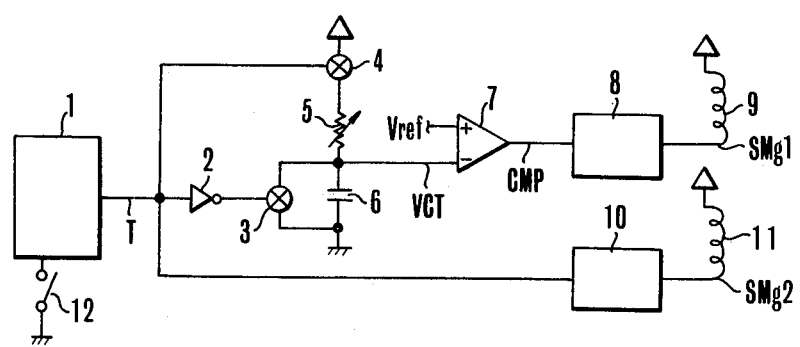
FIG. 1 is a circuit diagram showing an electric exposure time control device as a first embodiment of the invention.
Figure 2:
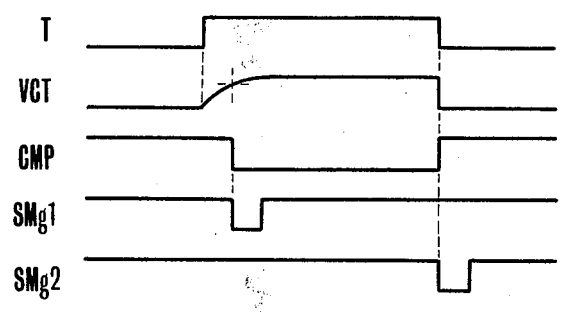
FIG. 2 is a timing chart showing the operation of the essential parts shown in FIG. 1.

Referring first to FIGS. 1 and 2 which show a first embodiment of the invention, the first embodiment includes an exposure time signal producing circuit 1 which produces signal T representative of a manually or automatically set exposure time in response to an exposure action starting signal, the signal T being arranged to have intervals of, say, 1/1000 sec, 1/500 sec, etc.; an inverter 2 which inverts the signal produced by the exposure time signal producing circuit; a known analog switch 3 which is connected in parallel with a capacitor 6 and has the control terminal thereof connected to the inverter 2; and another known analog switch 4. One side of the analog switch 4 is connected to a power source while the other is connected to a variable resistor 5. The control terminal of this analog switch 4 is connected to the output terminal of the exposure time signal producing circuit 1. The variable resistor 5 and the capacitor 6 jointly form a time constant circuit. One terminal of the capacitor 6 is grounded. The embodiment further includes a comparator 7 which is arranged to have a reference voltage $V_{ref}$ impressed on one terminal thereof and the terminal voltage VCT of the capacitor 6 impressed on another terminal thereof, the elements 5, 6 and 7 being arranged to provide an adjusting time in consideration of the times Tg and Tmg mentioned in the foregoing; a leading shutter curtain control circuit 8 which applies a signal SMg1 to a leading shutter curtain control magnet 9 for a predetermined length of time in response to the fall signal of the comparator 7; a trailing shutter curtain control circuit 10 which applies a signal SMg2 to a trailing curtain control magnet 11 for a predetermined length of time in response to the fall of the exposure time signal T produced from the exposure time signal producing circuit 1; and a switch 12 which is arranged to turn on when a shutter release begins. Further, the circuit which is composed of the above elements 5, 6 and 7 hereinafter will be called the adjusting time producing circuit.

The operation of the embodiment which is arranged as described above, is as described below with reference to FIG. 2.

Before the release begins, the release starting switch 12 is off. Accordingly, the exposure time signal T from the exposure time signal producing circuit 1 is at a low level (hereinafter will be called "0"), and the output of the inverter 2 is at a high level (hereinafter will be called "1"). The analog switch 3 turns on and the analog switch 4 turns off. The time constant capacitor 6 is short-circuited and the output Potential thereof is 0 volt. Therefore, the output of the comparator 7 is in the state of "1". Accordingly, the power supply for the predetermined length of time from the leading curtain control circuit 8 to the magnet 9 does not take place. When the release starting switch 12 closes, the exposure time signal T of the exposure time signal producing circuit 1 becomes "1" and the output of the inverter 2 becomes "0". This causes the analog switch 3 to turn off and analog switch 4 to turn on to charge the time constant capacitor 6 through the variable resistor 5. When the voltage VCT of the time constant capacitor 6 becomes higher than the reference voltage $V_{ref}$, the output of the comparator 7 changes from "1" to "0". At the same time as this, the output signal SMg1 of the leading curtain control circuit 8 becomes "0" for a predetermined period of time to effect a power supply to the leading curtain control magnet 9. This causes a known leading shutter curtain (which is not shown) to open the shutter. After the lapse of a set length of time, the exposure time signal SMg of the exposure time signal producing circuit 1 changes from "1" to "0" to effect a supply of power to the trailing curtain control magnet 11. Then, a known trailing shutter curtain (which is not shown) is closed to terminate an exposure operation. Further, the analog switch 3 turns on and the other analog switch 4 turns off to bring the embodiment back to the condition obtained prior to the start of the release.

Figure 3:
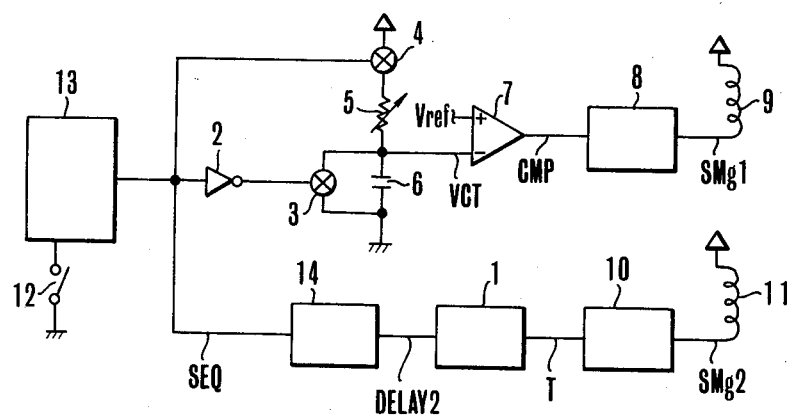
FIG. 3 is a circuit diagram showing an exposure time control device as a second embodiment of the invention.
Figure 4:
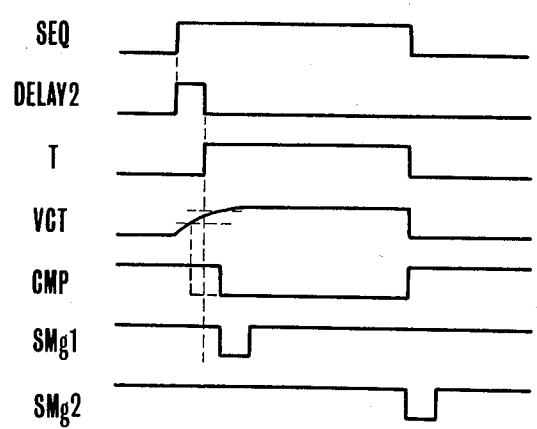
FIG. 4 is a timing chart showing the operation of the essential parts shown in FIG. 3.

A second embodiment of the invention is as shown in FIGS. 3 and 4, in which the parts identical with those shown in FIG. 1 are indicated by the same reference numerals. The following description covers only the parts that differ from the first embodiment. The second embodiment includes a sequence circuit 13 which produces a release action start signal SEQ in response to the operation of the release switch 12. The release action start signal SEQ is applied to the analog switch 4, the inverter 2 and a delay circuit 14. A signal DELAY2 produced from this delay circuit 14 is arranged to be applied to the trailing curtain control circuit 10 through an exposure time signal producing circuit 1'. The second embodiment which is arranged in this manner operates in the following manner:

When the release switch 12 is turned on, the release action start signal SEQ of the sequence circuit 13 becomes "1". This causes the analog switch 3 to turn off and the analog switch 4 to turn on. The time constant capacitor 6 is charged through the variable resistor 5. When the voltage VCT of the capacitor 6 becomes higher than the reference voltage $V_{ref}$, the output of the comparator 7 changes from "1" to "0". The leading curtain control circuit 8 then operate to effect a supply of power to the magnet 9 for the leading curtain for a prdetermined length of time. With the power supply effected to the magnet, the shutter opens. When the output of the sequence circuit 13 becomes "1", the delay circuit 14 operates to produce an output of "1" for a predetermined length of time and then returns to "0". At this time, the exposure time signal producing circuit "1" operates to produce an output of "1" for a predetermined length of time and then comes back to the state of "0". Then, the trailing curtain control circuit 10 operates to effect a supply of power for a predetermined length of time to the trailing curtain control magnet 10. This causes the shutter to close to end an exposure. Concurrently with this, the output of the sequence circuit 13 becomes "0" and the embodiment comes back to the original condition. The plus exposure time adjusting method mentioned in the foregoing may also be carried out by lowering the lever of the reference voltage to be impressed on the positive input terminal + of the comparator 7 to set it in such a manner that the output of the comparator 7 changes from "1" to "0" before the output of the circuit 1 changes from "0" to "1" as shown in a dotted line at "CMP" in FIG. 4.

Figure 5:
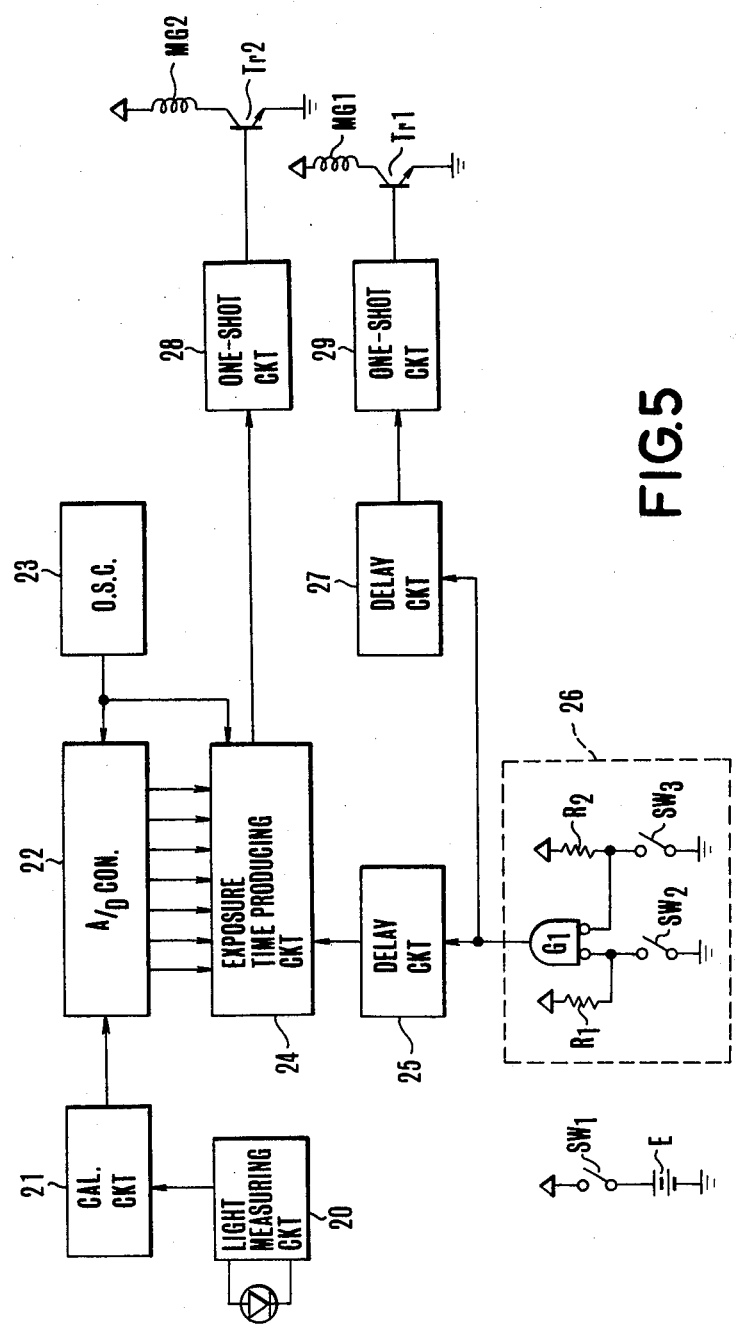
FIG. 5 is a circuit diagram showing another exposure time control device as a third embodiment of the invention.
Figure 6:
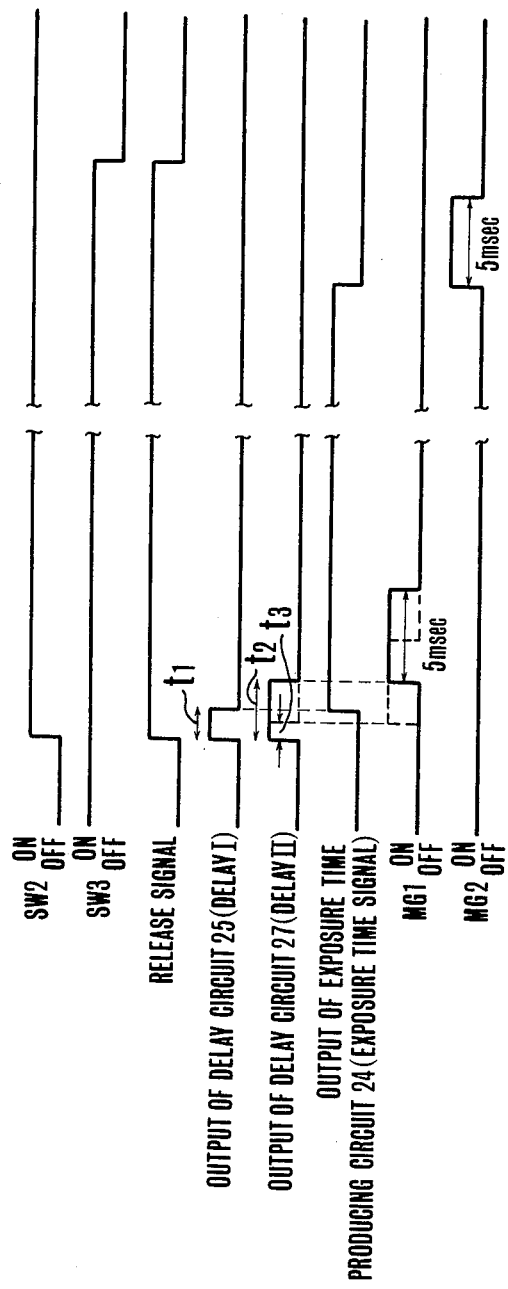
FIG. 6 is a timing chart showing the operation of the essential parts shown in FIG. 5.

A third embodiment of the invention is as shown in FIGS. 5 and 6. Referring to FIG. 5, the third embodiment includes a known light measuring circuit 20; a known calculating circuit 21 which computes the output of the light measuring circuit 20 together with input information from a film sensitivity setting member, a preset aperture value setting member, etc. which are not shown, the calculating circuit 21 being thus arranged to give a shutter time value according to the input information; a known A-D converter circuit 22 which A-D converts the output of the calculating circuit 21; a known oscillator 23; an exposure time producing circuit 24 which will be further described hereinafter; a delay circuit 25 qhich gives a predetermined length of delay time; a logic circuit 26 which produces a release signal and is composed of a NAND gate G1, resistors R1 and R2 and switches SW2 and SW3, the switch SW2 being arranged to be turned on by a release operation and the switch SW3 being arranged to turn on upon completion of film winding and to turn off upon completion of an exposure operation; a known adjustable delay circuit 27; a known one-shot circuit 28 and 29 (or a monostable multi-vibrator) which produces pulses of a predetermined level for a predetermined period of time; a transistor Tr1 which drives and controls the magnet Mg1; another transistor Tr2 which drives and controls the magnet Mg2; a power source switch SW1; and a power source E.

Next, the operation of the embodiment arranged as described in the foregoing is described with reference to FIG. 6 as follows: A power source voltage is supplied to each circuit of the embodiment when the switch SW1 turns on. The light measuring circuit 20 produces a voltage corresponding to the brightness of an object to be photographed and applies it to the calculating circuit 21. The exposure calculating circuit 21 receives voltages respectively corresponding to brightness information, film sensitivity information and preset aperture value information. The circuit 21 then performs computation on the basis of the APEX system to produce a voltage corresponding to a TV value. The analog value which corresponds to the TV value is converted into a digital value at the A-D converter circuit 22. At the logic circuit 26, the switch SW3 is on when a release is possible with the film having been wound up. Under this condition, when the release switch SW2 turns on, all inputs to the NAND gate G1 become "0". The output of the gate G1 becomes "1" to produce a release signal therefrom. Since the release switch SW3 turns off after completion of the release, the output of the gate G1 remains in the state of "0" and never produce a release signal under a condition in which film winding is not completed. The delay circuits 25 and 27 operate in response to the release signal. The outputs of the delay circuits 25 and 27 simultaneously become "1" and respectively produce signals which become "0" after the lapse of predetermined periods of time t1 and t2. When the output of the delay circuit 27 changes from "1" to "0", the one-shot circuit 29 operates to produce pulses of "1" for 5 msec. Concurrently with this, the transistor Tr1 turns on to effect a power supply to the magnet MG1 for the leading curtain to cause the curtain (which is not shown) to begin to travel.

When the output of the delay circuit 25 changes from "1" to "0", the exposure time producing circuit 24 immediately performs a time counting operation to count a time corresponding to the TV value which has been A-D converted. During this time counting operation, the exposure time producing circuit 24 produces a signal of "1", which changes to "0" concurrently with completion of the time counting operation. At this time, the one-shot circuit 28 comes to operate to produce pulses of "1" for 5 msec. At the same time as this, the transistor Tr2 turns on to effect a power supply for 5 msec to the magnet MG2 for the trailing curtain (which is not shown). Then, the trailing curtain operates to terminate the exposure operation. The switch SW3 turns off concurrently with termination of the exposure operation to thereby inhibit next exposure. The exposure error which otherwise results from the travelling speeds of the leading and trailing shutter curtains and their action time lag, can be eliminated by suitably adjusting the delay time of the delay circuits 25 and 27. As a result of this arrangement, the discrete operation tolerance range for the shutter mechanism can be broadened and this in turn permits reduction in the cost of the camera. Further, the plus exposure time adjusting method mentioned in the foregoing can be also realized by setting the delay time of the delay circuit 27 at t3 as shown in FIG. 6.

Figure 7:
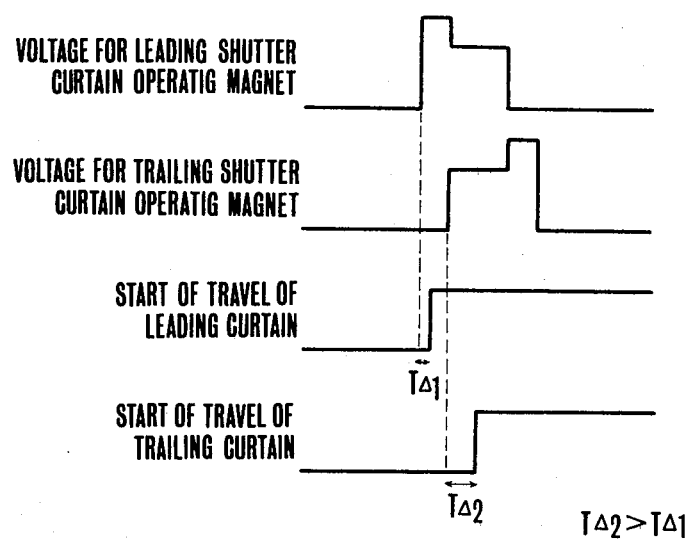
FIG. 7 is a timing chart showing the relation of magnet voltage to shutter operation delay timing when power is to be supplies to two magnets employed.

Meanwhile, use of different magnets discretely for the leading curtain and the trailing curtain results in a problem as shown in FIG. 7. More specifically, when the shutter operating speed is high, there arises a time zone in which supplies of power are simultaneously effected to the magnets. The simultaneous supplies of power result in a drop of power source voltage due to the internal resistance of the power source. The drop of the power source voltage then degrades the operation characteristic of the magnets to prolong the time lag. This in turn prolongs the exposure time. The adverse effect of this problem increases accordingly as the controlled time becomes shorter. An attempt to solve this problem by using an additional circuit or different kinds of magnets results in an increase in cost.

Whereas, in accordance with this invention, this problem is solved by the following arrangement: The adjustable second timer circuit counts a correction time in response to the operation of the first timer circuit which counts the exposure time of the camera. The electromagnet for the leading shutter curtain is actuated after the lapse of the time counted by the second timer circuit. Then, the electromagnet for the trailing shutter curtain is actuated after the lapse of time counted by the first timer circuit. In the first embodiment shown in FIG. 1, the element 1 corresponds to the first timer circuit and the elements 5, 6 and 7 to second timer circuit.

Figure 8:
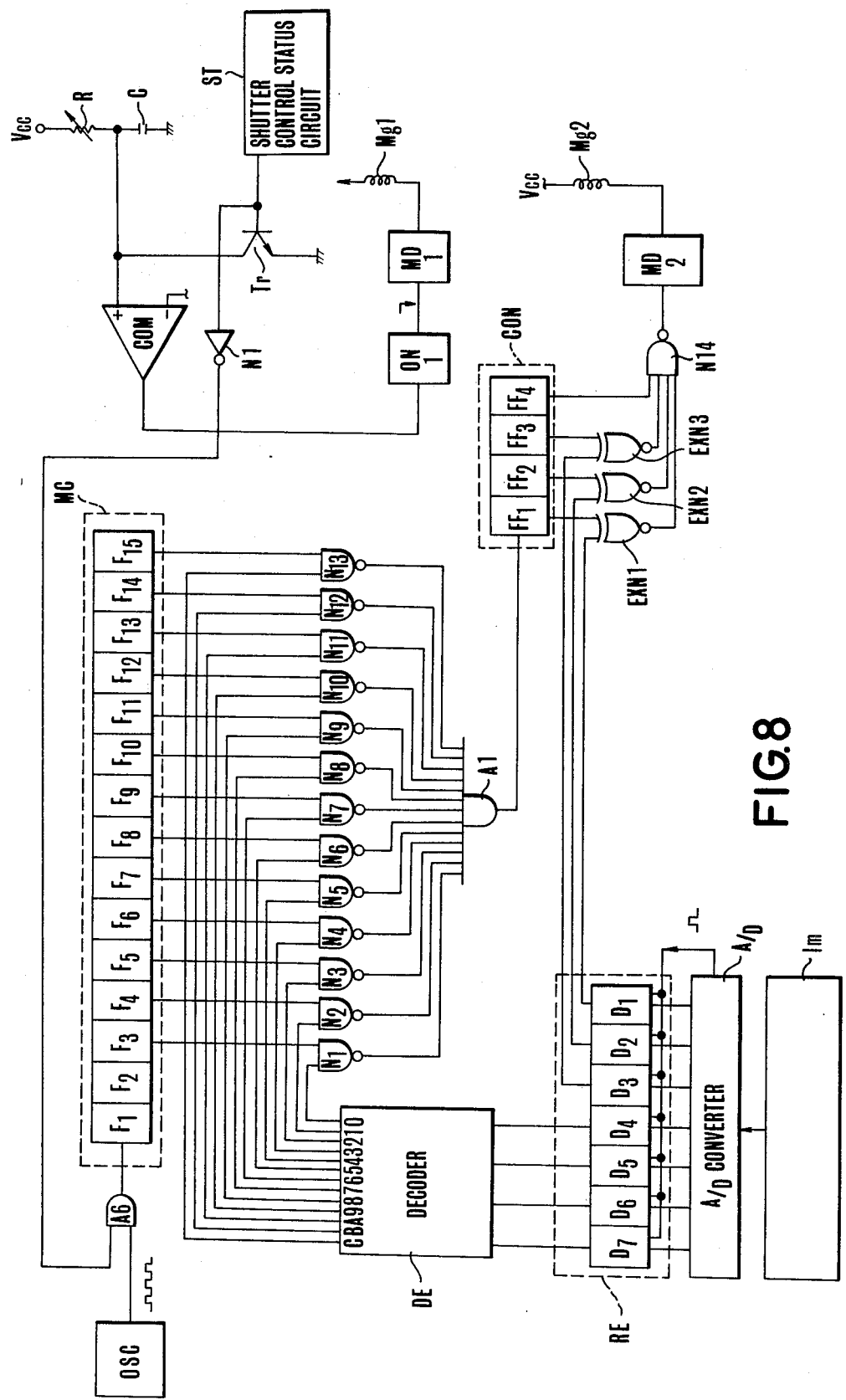
FIG. 8 is a circuit diagram showing an exposure time control device of a camera as a further embodiment of the invention.

FIG. 8 shows an exposure control circuit of a camera as a further embodiment of the invention. The embodiment includes a clock pulse oscillator OSC which produces pulses of 64 KHz; and a main counter MC which counts shutter time and is of 15 bit arrangement F1-F15 arranged for counting shutter time. Since the counter MC is arranged to count the pulses of 64 KHz, the output pulses of F3 is of 8 KHz; F4 is of 4 KHz; F5 is of 2 KHz; F6 is of 1 KHz; F7 is of 512 Hz; F8 is of 256 Hz; F9 is of 128 Hz; F10 is of 64 Hz; F11 is of 32 Hz; F12 is of 16 Hz; F13 is of 8 Hz; F14 is of 4 Hz; and F15 is of 2 Hz. The embodiment further includes a shutter time information producing circuit lm which produces an analog output corresponding to a shutter time value Tv in the APEX system based on brightness, etc.; a known analog-to-digital converter circuit A-D which is arranged to convert the output of the information producing circuit 1 m into a digital value at an increment of $\frac{1}{8}$ step; a latching register RE consisting of flip-flop circuits D1–D7 which are arranged to latch weighted digital information values, the flip-flop circuits D1–D3 being arranged to latch information values below the decimal point and the flip-flop circuits D4–D7 to latch information values above the decimal point, that is, the flip-flop circuit D1 being arranged to latch digital information of weighted value of $\frac{1}{8}$, D2 to latch the information of 2/8, D3 the information of 4/8, D4 the information of 1, D5 the information of 2, D6 the information of 4 and D7 the information of 8 respectively; a known decoder DE which decodes the informatin of the values above the decimal point of the register RE; and NAND gates N1–N13 which are arranged to be chosen according to the output of the decoder DE. The relation among the contents of the register, the output of the decoder, the chosen state of the NAND gates and the shutter time value are as shown in FIG. 9. The embodiment further comprises an AND gate A1 which is connected to the output terminals of the NAND gates N1–N13; a counter CON consisting of flip-flop circuits FF1–FF4 which in conjunction with the main counter MC forms a shutter time counting counter; exclusive OR gates exN1–exN3 which are arranged to control the shutter time by the information below the decimal point; a NAND gate 14 arranged to produce a shutter closing signal; a magnet driver MD2 which is arranged to hold a tailing shutter curtain and has a response delay time Tmg2; a time constant circuit R, C which is arranged to produce an adjusting time; a comparator COM; a one-shot circuit ON1; a magnet driver MD1; a magnet Mg1 which is arranged to control a leading shutter curtain and has a response delay time Tmg1 (see FIG. 10); an inverter N1; a transistor Tr; and a shutter control status circuit ST. The counter MC performs a counting operation in synchronism with the fall of pulses while the other counter COM is arranged to count in synchronism with the rise of the pulses. The elements RE, DE, MC, A6, N1–N13, A1, CON, exN1–exN3 and N14 jointly form the exposure time producing circuit shown in FIG. 5. The embodiment which is arranged as described above operates in the following manner:

Let us assume that the information circuit 1 m is now producing an output corresponding to 1/1000 sec. Under this condition, all the outputs of the registers D1–D7 are at a low level (hereinafter will be called "0") as shown in FIG. 9. The output terminal 0 of the decoder produces an output of a high level (hereinafter will be called "1") and the NAND gate N1 is selected. When a shutter release operation is performed under this condition, the level of the shutter control status circuit ST becomes "0" and transistor Tr turns off. By this, the positive input terminal+ of the comparator COM is released from a "0" level. Therefore, the capcitor C beings to be charged. When the level of the output of the comparator COM changes to "0" after the lapse of a length of time determined by the capacitor C and the resistor R, the one-shot circuit ON1 operates to produce pulses of a predetermined time. The magnet driver MD1 is operated by the pulses to operate the leading curtain controlling magnet Mg1. Then, after the lapse of the response delay time thereof, the magnet Mg1 causes the leading shutter curtain to begin to travel.

Further, when the level of the output of the shutter control status circuit becomes "0", the AND gate A6 opens at the same time as this to transmit the pulses from the pulse oscillator OSC to the main counter MC to cause the counter MC to begin the exposure time counting action thereof. Since the exposure time is 1/1000 sec and the NAND gate N1 is selected as mentioned above, the NAND gate N1 produces pulses in response to the output of the flip-flop F3 of the counter MC. The pulses are transmitted to the counter CON through the AND gate A1. When 8 pulses are counted by the counter CON, the output level of the flip-flop FF4 of the counter CON is changed to "1" to cause the NAND gate N14 to produce a shutter closing signal therefrom.

Since the output of the flip-flop F3 is pulses of 8 KHz as mentioned in the foregoing, when eight of the pulses are counted, there is obtained a time of $\frac{1}{8}$ KHz×8 1/1 KHz=1 msec. Then, after the lapse of this time, the magnet driver MD2 is caused to drive the trailing curtain holding magnet Mg2. With the magnet Mg2 thus driven, the trailing shutter curtain is allowed, after the lapse of the response delay time Tmg2 of the magnet Mg2 (see FIG. 10), to travel to bring the exposure to an end.

In the case of control for a 1/500 sec exposure, the output level of "1" is produced from the output terminal 1 of the decoder DE to select the NAND gate N2 as shown in FIG. 9. When the level of the shutter control status circuit ST becomes "0" in response to a shutter release operation, the transistor Tr turns off to release the input terminal+ of the comparator COM from a "0" level. This causes the time constant circuit CR to begin to operate. Then, when the output of the comparator COM changes to a "0" level, the one-shot circuit operates to form pulses of a predetermined time. The pulses then actuate the magnet driver MD1 to drive the leading curtain operating magnet Mg1. Following this, after the lapse of the response delay time Tmg1 of the magnet Mg1, the leading shutter curtain begins to travel. Meanwhile, the AND gate A6 is opened concurrently with the change of the shutter control status circuit ST to a "0" level. With the AND gate A6 thus opened, the main counter MC begins to count. When eight of the pulses from the gate N2 is counted by the counter CON, the counter CON produces an output of "1" from the flip-flop FF4 thereof to have a shutter closing signal produced from the NAND gate N14. Further, at this time, the NAND gate N2 is selected and, when 8 pulses of pulses of 4 KHz are counted, a time of $\frac{1}{4}$ KHz×8=2/1 KHz=2 msec is obtained. After the lapse of this time, the magnet driver MD2 drives the trailing curtain holding magnet Mg2. Then, after the lapse of the response delay time Tmg2 of the magnet Mg2, the trailing shutter curtain is allowed to travel to terminate an exposure.

The exposure time control for other exposure times of 1/250–4 sec is performed in the same manner as the control described above. In each of these cases, the time α defined by the time constant circuit CR and the shutter time count T defined by the exposure time producing circuitry formed by the elements MC, CON, DE, RE, A6, N14, etc. are started concurrently with the change of the output of the shutter control status circuit ST to a "0" level. This arrangement gives a result that satisfies a relation of $(TR+Tmg2)-(TF+Tmg1)=\alpha$, wherein TR represents a length of time required by the trailing shutter curtain for travelling from the start position thereof to the end part al of an image aperture shown in FIG. 10; and TF a length of time required by the leading shutter curtain for travelling from the start position thereof to another end part a2 of the image aperture shown in FIG. 10.

Referring now to FIG. 10, the leading and trailing shutter curtains in this embodiment operate as follows: With the correction time arrangement allowed to operate concurrently with the start of shutter time, counting to delay the supply of power to the leading curtain operating magnet until termination of the correction time as described above, a proper shutter time can be obtained. In other words, the correction time α to be defined by the time constant circuit CR is adjusted to be $(TR+Tmg2)-(TF+Tmg1)=\alpha$. The proper shutter time which allows the film which is (not shown) to be exposed to light to a proper degree, can be obtained by effecting a power supply to the leading curtain operating magnet after the lapse of the correction time α, and by effecting a supply of power to the trailing curtain holding magnet after completion of the shutter time count.

The foregoing description of embodiments applies to cases where the shutter time varies stepwise. In cases where the shutter time becomes a value of an intermediate point between one step and another, one of exclusive NOR gates exN1-exN3 is first selected as applicable to the contents of the flip-flops D1-D3 of the register RE and then, after time count has been performed on the basis of shutter time of more than one step as described above, the counter CON performs a further count on the basis of the information of the intermediate step stored in the register D1-D3. After the lapse of this time, every NOR gate exN1-exN3 produces an output of "1". Then, a shutter closing signal is produced from the NAND gate N14 to control the shutter time. Therefore, accurate shutter time control can be always accomplished even where the shutter time happens to be of an intermediate value.

As has been described in detail, the invention removes the limit heretofore imposed on adjustment of exposure errors. Besides, the problem of errors that have been caused by the use of two magnets in accordance with the prior art methods also can be solved. The invention thus permits use of a magnet having a large time lag. Therefore, the exposure time control device according to the invention can be easily manufactured to have a required degree of precision.

What we claim:

1. An electrical exposure time control apparatus for a camera having a leading shutter curtain and a trailing shutter curtain which curtains overlap one another by a certain extent, comprising:
   (a) first means (SMg1) for releasing said leading shutter curtain after a first time delay:
   (b) first adjusting time producing means (5, 6, 7) fordetermining said first ime delay and controlling siad first means;
   (c) an electromagnet (SMg2) having a certain response delay time for releasing said trailing shutter curtain after elapse an exposure time;
   (d) electric timing means (1') for determining said exposure time and controlling said electromagnet;
   (e) second adjusting time producing means (14) for adding a second time delay to said exposure time; and
   (f) means (13) for producing a signal to render both of the first and second adjusting time producing means effective.

2. An electrical exposure time control apparatus according to claim 1, wherein said first time delay corresponds to a time lapse to compensate exposure errors caused by the certain extent of overlap of said leading and said trailing shutter curtains and the response delay time of said electromagnet.

3. An electrical exposure time control apparatus according to claim 2, wherein said first adjusting time producing means includes a resistor and a capacitor connected in series with said resistor.

4. An elecrrical exposure time control apparatus according to claim 3, further comprises a comparator having an input connected across said capacitor.

5. An electrical exposure time control apparatus for a camera having a leading shutter curtain and a trailing shutter curtain which curtains overlap one another by a certain extent, comprising:
   (a) a first electromagnet for releasing said leading shutter curtain after a first time delay;
   (b) first adjusting time producing means for producing said first time delay and controlling said first electromagnet;
   (c) a second electromagnet having a certain response delay time for releasing said trailing shutter curtain after an exposure time;
   (d) electric timing means for determining said exposure time and controlling said second electromagnet; and
   (e) second adjusting time producing means for adding a second time delay to said exposure time.

6. An electrical exposure time control apparatus for a camera having a leading shutter curtain and a trailing shutter curtain which curtains overlap one another by a certain extent, comprising;
   (a) first means (SMg1) for releasing said leading shutter curtain after a first time delay;
   (b) first adjusting time producting means (5, 6, 7) for determining said first time delay and controlling said first means;
   (c) an electromagnet (SMg2) having a certain response delay time for releasing said trailing shutter curtain after an exposure time;
   (d) electric timing means (1') for producing said exposure time; and
   (e) second adjusting time producing means for adding a second time delay to said exposure time, said electromagnet being actuated after a lapse of the added time.

7. An electrical exposure time control apparatus according to claim 6 wherein said first time delay corresponds to a time lapse to compensate exposure errors caused by the certain extent of overlap of the leading and the trailing shutter curtains and the response delay time of the electromagnet.

* * * * *